United States Patent
Appriou et al.

[19]

[11] Patent Number: 6,149,884

[45] Date of Patent: Nov. 21, 2000

[54] METHOD OF TREATING GASEOUS WASTE FROM A UNIT FOR MANUFACTURING AN OPTICAL FIBER PREFORM, IN ORDER TO RECOVER GERMANIUM THEREFROM

[75] Inventors: André Appriou, La Demi Lune; Laurent Calvo, Lille; Gérard Lavanant, Lambersart, all of France

[73] Assignee: Alcatel, Paris, France

[21] Appl. No.: 09/381,182

[22] PCT Filed: Jan. 18, 1999

[86] PCT No.: PCT/FR99/00083

§ 371 Date: Sep. 16, 1999

§ 102(e) Date: Sep. 16, 1999

[87] PCT Pub. No.: WO99/36366

PCT Pub. Date: Jul. 22, 1999

[30] Foreign Application Priority Data

Jan. 19, 1998 [FR] France .................................. 98 00487

[51] Int. Cl.[7] .......................... C01G 17/00; C01G 17/04; C22B 41/00
[52] U.S. Cl. .......................... 423/92; 423/240 R
[58] Field of Search .......................... 423/89, 92, 240 R; 65/413, 503

[56] References Cited

U.S. PATENT DOCUMENTS

| | | |
|---|---|---|
| 4,385,915 | 5/1983 | Amelse et al. . |
| 4,578,253 | 3/1986 | Gill et al. . |
| 6,054,104 | 4/2000 | Lankewicz et al. . |

FOREIGN PATENT DOCUMENTS

| | | |
|---|---|---|
| 0 765 845 A1 | 4/1997 | European Pat. Off. . |
| 3206145 A1 | 9/1983 | Germany . |

*Primary Examiner*—Steven P. Griffin
*Assistant Examiner*—Christina Ildebrando
*Attorney, Agent, or Firm*—Sughrue, Mion, Zinn, Macpeak & Seas, PLLC

[57] ABSTRACT

The invention relates to a method of treating germanium-containing gaseous waste coming from a unit for manufacturing an optical fiber preform, the method comprising the following steps:

a liquid effluent is formed from the gaseous waste; and the germanium is precipitated in the liquid effluent. According to the invention, the precipitation is performed by adding magnesium MgO to the liquid effluent.

6 Claims, 1 Drawing Sheet

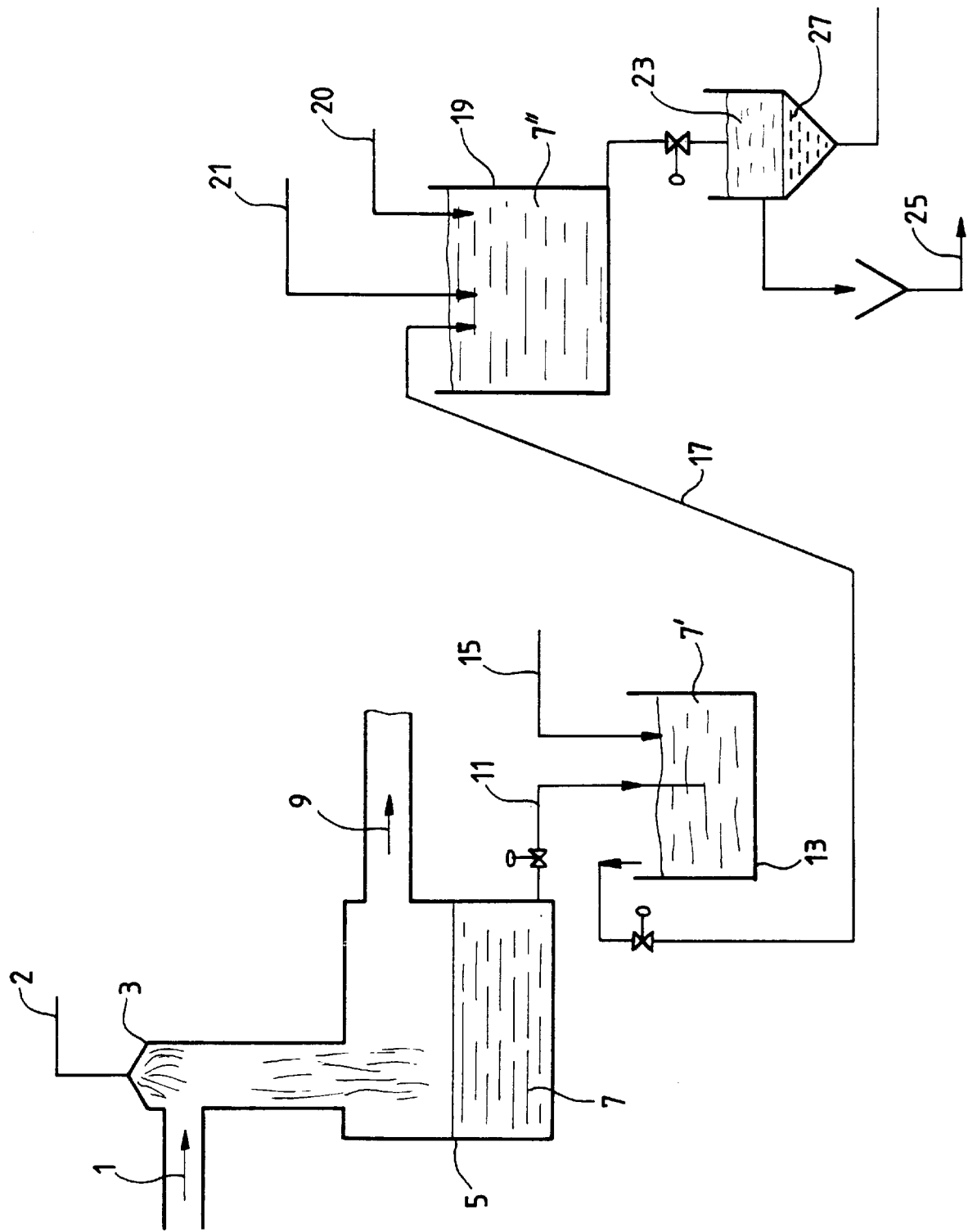

METHOD OF TREATING GASEOUS WASTE FROM A UNIT FOR MANUFACTURING AN OPTICAL FIBER PREFORM, IN ORDER TO RECOVER GERMANIUM THEREFROM

BACKGROUND OF THE INVENTION

The invention relates to a method of treating gaseous waste containing germanium and coming from a unit for manufacturing an optical fiber preform.

In conventional manner, a unit for manufacturing an optical fiber preform causes gases of the silicon chloride $SiCl_4$ and germanium tetrachloride $GeCl_4$ type to react with oxygen at high temperature. The resulting silicon oxide $SiO_2$ is deposited in successive layers to form a cylindrical preform. Germanium oxide is deposited in the central layers of the preform so as to form a core that has a refractive index different from that of the silica.

Only a small fraction of the germanium tetrachloride reacts with oxygen. The germanium tetrachloride that has not reacted, and the germanium oxide that is not deposited, are discharged by the manufacturing unit together with hydrogen chloride HCl. These gases cannot be discharged as such into the environment. That is why it is necessary to treat them.

Furthermore, it is also desirable to recover the germanium, not only to preserve environment, but also to recycle the germanium for subsequent reuse in the manufacture of optical fiber preforms so as to reduce manufacturing costs.

A method known from document U.S. Pat. No. 4,385,915 serves to treat such gaseous waste and to recover the germanium. It comprises the following steps in particular:

forming a liquid effluent from the gaseous waste, e.g. by causing the gaseous waste to react with caustic soda; the liquid effluent then contains not only germanium, but also hypochlorite;

reducing the hypochlorite, e.g. by adding oxygenated water; and precipitating the germanium in the liquid effluent treated in this way by adding magnesium sulfate.

The precipitation of the germanium contained in the effluent by means of the magnesium sulfate releases sulfates in the supernatant phase, which sulfates are compounds that are harmful to the environment.

SUMMARY OF THE INVENTION

The object of the present invention is thus to develop a method of processing germanium-containing gaseous waste, whereby, after precipitation, the release of environmentally-harmful compounds is avoided.

To this end, the invention provides a method of treating gaseous waste containing germanium and coming from a unit for manufacturing an optical fiber preform, the method comprising the following steps:

forming a liquid effluent from said gaseous waste; and
precipitating the germanium in said liquid effluent;
the method being characterized in that said precipitation is performed by adding magnesia MgO to said liquid effluent.

The addition of magnesia makes it possible to cause the germanium contained in the effluent to be precipitated so that it can be recovered for recycling purposes, without releasing environmentally-harmful compounds such as sulfates.

The germanium precipitates in the form of germanates. The quantity of magnesia introduced into the effluent corresponds to a stoichiometric ratio of magnesium to germanium that is typically 1.5 to 1, and gives rise to low magnesia consumption for precipitating the germanium.

In an aspect of the invention, the gaseous waste contains germanium in the form of germanium tetrachloride $GeCl_4$ and the step of forming a liquid effluent consists in causing caustic soda to react with said gaseous waste so that the liquid effluent contains germanium and hypochlorite.

In order to reduce the hypochlorite, it is possible to use formic acid, for example.

By way of example, the magnesia used can be nonpurified and in the form of a powder. It is introduced into the effluent in a proportion such that it raises its pH to a value lying in the range 8 to 10 so that the germanium precipitates in the effluent. Provision is made to treat the effluent without prior addition of caustic soda, its pH being about 4, or to treat it after caustic soda has been added to raise its pH to about 7. In the first case, the possibility of working in an acid medium makes it possible to reduce the consumption of caustic soda.

By a buffer effect of the magnesia, the supernatant phase of the effluent after the germanium has been precipitated is at substantially the same pH, equal to 9.5, as that obtained at the beginning of precipitation. Where necessary, an acid is added to reduce this pH value to a value that is acceptable for discharging the surface matter into the environment.

The precipitate is in the form of a sludge containing the germanium that was contained in the effluent. This sludge is filtered and optionally dried to produce a "cake" ready for retreatment to extract the germanium.

The method of the invention is simple to implement and it applies to preform manufacture installations of the chemical vapor deposition type and of the plasma deposition type, in which germanium is oxidized and incorporated in the silica to form a doping element in a "core" zone of the preform.

BRIEF DESCRIPTION OF THE DRAWING

The sole FIGURE is a diagrammatic block diagram of a method of the invention.

DETAILED DESCRIPTION OF THE INVENTION

The chlorides 1 of the HCl and $GeCl_4$ type as transported by air are discharged by an installation for manufacturing optical fiber preforms (not shown), e.g. having a chemical vapor deposition unit.

The gaseous chlorides are scrubbed out in a tower 3 into which caustic soda 2 is sprayed in the form of small drops. The gaseous chlorides react with the drops of caustic soda to give rise, in a tank 5 placed at the foot of the tower, to a solution 7 of sodium chloride and of sodium hypochlorite having a pH equal to about 9.5. The air moving through the tower is exhausted to the outside 9 after the gaseous chlorides have been scrubbed out therefrom.

The solution 7 collected in the tank 5 of the tower forms an effluent. Before being discharged into the environment, this effluent is poured 11 into a second tank 13 and is treated by the addition of formic acid 15 which leads to the hypochlorite being reduced into sodium chloride with carbon dioxide being given off. After reduction, the effluent 7' has a pH equal to about 4.5.

To recover the germanium present in the effluent, the effluent is poured 17 into a third tank 19 where it has non-pure magnesia 21 added thereto in the form of a powder.

The magnesia is introduced in a quantity such that the pH of the effluent 7" is substantially equal to 9.5 so that the germanium precipitates. This quantity corresponds to a stoichiometric ratio of magnesium to germanium that is typically 1.5 to 1.

In a variant of the method of the invention, between adding formic acid 15 and adding magnesia 21, caustic soda 20 is added to raise the pH of the effluent 7' from 4.5 to a value equal to about 7.

During the precipitation, the pH of the effluent 7" remains substantially constant at the initial value representing a buffer effect of the magnesia in the effluent. If necessary, this value is lowered to a value that is acceptable for discharging the supernatant phase 23 into the environment 25.

The precipitate is in the form of a sludge 27 which is transported to a filter press so as to filtered and dried to obtain a "cake" suitable for treatment in order to extract the germanium therefrom.

We claim:

1. A method of treating gaseous waste containing germanium and coming from a unit for manufacturing an optical fiber preform, the method comprising the following steps:

forming a liquid effluent from said gaseous waste; and precipitating the germanium in said liquid effluent;

wherein said precipitation is performed by adding magnesia MgO to said liquid effluent.

2. A method according to claim 1, wherein said gaseous waste contains germanium in the form of germanium tetrachloride $GeCl_4$, and wherein said step of forming a liquid effluent comprises adding caustic soda to react with said gaseous waste so that said liquid effluent contains germanium and hypochlorite.

3. A method according to claim 2, wherein said hypochlorite is reduced after said step of forming a liquid effluent and before said precipitation step.

4. A method according to claim 3, wherein said hypochlorite is reduced by adding formic acid.

5. A method according to claim 4, wherein the caustic soda is added between said step of forming a liquid effluent and said reduction of the hypochlorite.

6. A method according to claim 1, wherein the quantity of magnesia added to the effluent is such as to give it a pH in the range of 8 to 10.

* * * * *